United States Patent
Bonnefoy et al.

(10) Patent No.: US 12,280,875 B2
(45) Date of Patent: Apr. 22, 2025

(54) DETACHABLE MOTORIZED DEVICE FOR CLOSING A SPACE, IN PARTICULAR INSIDE AN AIRPLANE

(71) Applicant: Safran Seats, Plaisir (FR)

(72) Inventors: Bastien Bonnefoy, Issoudun (FR); Laurent Ligonniere, Issoudun (FR); José Bernardo De Morais, Chateauroux (FR)

(73) Assignee: Safran Seats, Plaisir (FR)

( * ) Notice: Subject to any disclaimer, the term of this patent is extended or adjusted under 35 U.S.C. 154(b) by 269 days.

(21) Appl. No.: 17/632,216

(22) PCT Filed: Jul. 28, 2020

(86) PCT No.: PCT/EP2020/071267
§ 371 (c)(1),
(2) Date: Feb. 1, 2022

(87) PCT Pub. No.: WO2021/023581
PCT Pub. Date: Feb. 11, 2021

(65) Prior Publication Data
US 2022/0274709 A1    Sep. 1, 2022

(30) Foreign Application Priority Data
Aug. 5, 2019 (FR) ...................................... 1908963

(51) Int. Cl.
*B64D 11/06* (2006.01)
(52) U.S. Cl.
CPC ................................ *B64D 11/0606* (2014.12)
(58) Field of Classification Search
CPC . B64D 11/0023; B64D 11/0606; E06B 9/581; E06B 9/66; B60R 21/06
See application file for complete search history.

(56) References Cited

U.S. PATENT DOCUMENTS 5,139,075 A * 8/1992 Desrochers ............... E06B 9/70
192/48.91
5,540,269 A * 7/1996 Plumer ..................... E06B 9/84
160/3
(Continued)

FOREIGN PATENT DOCUMENTS

EP    1211379 A2 * 6/2002    ............... E06B 9/42
FR    2697558 A1    5/1994
(Continued)

OTHER PUBLICATIONS

International Patent Application No. PCT/EP2020/071267, International Search Report (with English translation) and Written Opinion, dated Oct. 28, 2020.

*Primary Examiner* — Richard Green
*Assistant Examiner* — Michael A. Fabula
(74) *Attorney, Agent, or Firm* — Kilpatrick Townsend & Stockton LLP

(57) ABSTRACT

A detachable device for closing a space inside an airplane includes:
- a frame comprising at least one upright, the frame comprising at least one attachment interface with a structural element,
- a curtain assembly comprising a flexible curtain,
- a roller around which the flexible curtain can be wound, and
- at least one guide device comprising an electric-motor actuator, the guide device-being capable of translationally guiding the flexible curtain relative to the upright such that the flexible curtain can be moved in a direction of movement parallel to a longitudinal direction of the upright between a stowed position in which the flexible curtain is mainly wound around the roller and (Continued)

an extended position in which the flexible curtain is mainly unwound relative to the roller.

12 Claims, 5 Drawing Sheets

(56) References Cited

U.S. PATENT DOCUMENTS

| | | | | |
|---|---|---|---|---|
| 5,810,065 | A * | 9/1998 | Solari | E06B 9/70 160/310 |
| 6,019,156 | A * | 2/2000 | Wagner | E06B 9/13 160/310 |
| 6,086,133 | A * | 7/2000 | Alonso | B60J 1/2058 296/141 |
| 6,691,761 | B1 * | 2/2004 | Alkhoury | E06B 9/581 160/98 |
| 7,934,533 | B2 * | 5/2011 | Walter | B60J 1/2044 160/370.22 |
| 9,027,880 | B2 * | 5/2015 | Breuer | B64D 11/0023 244/121 |
| 9,074,414 | B1 * | 7/2015 | Steffi | E06B 9/66 |
| 9,605,474 | B1 * | 3/2017 | McCauley | E06B 9/40 |
| 11,760,490 | B2 * | 9/2023 | Bonnefoy | B64D 11/0606 244/118.6 |
| 2008/0264582 | A1 * | 10/2008 | Coenraets | E06B 9/581 160/319 |
| 2012/0012704 | A1 | 1/2012 | Mosler et al. | |
| 2012/0112505 | A1 | 5/2012 | Breuer et al. | |
| 2013/0112354 | A1 * | 5/2013 | Hardison, III | E06B 9/86 160/405 |
| 2017/0283064 | A1 | 10/2017 | Robinson | |
| 2021/0221516 | A1 * | 7/2021 | Bonnefoy | B64D 11/0641 |
| 2021/0380256 | A1 * | 12/2021 | Wisniewski | B64D 11/0606 |

FOREIGN PATENT DOCUMENTS

| | | | | |
|---|---|---|---|---|
| GB | | 2380218 A * | 4/2003 | E06B 9/11 |
| RU | | 190181 U1 | 6/2019 | |
| WO | | 2015153923 A1 | 10/2015 | |

* cited by examiner

[Fig. 5]
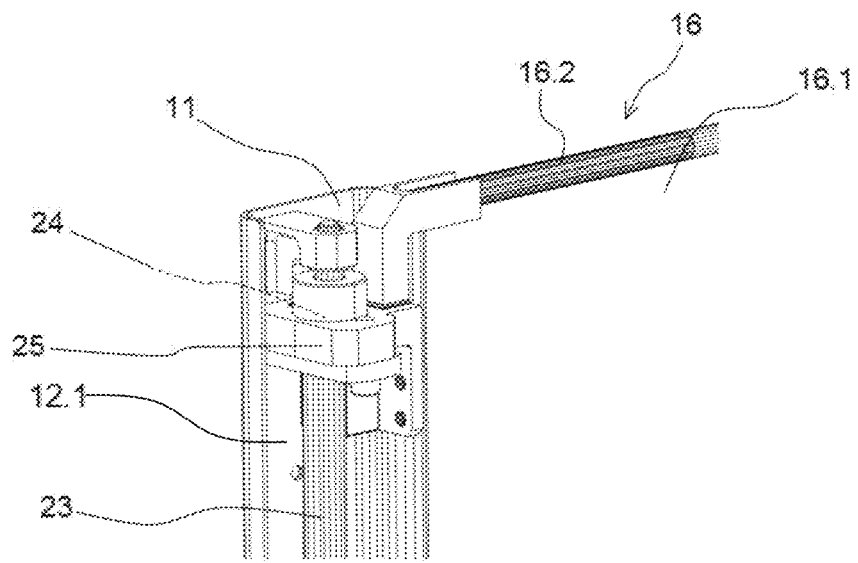
[Fig. 6a]
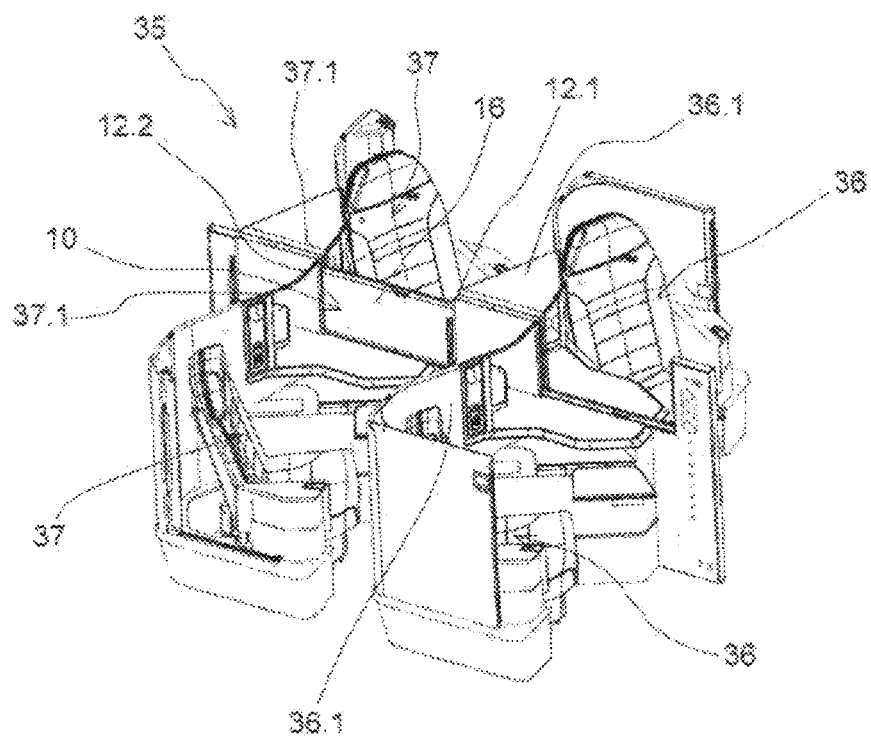

DETACHABLE MOTORIZED DEVICE FOR CLOSING A SPACE, IN PARTICULAR INSIDE AN AIRPLANE

CROSS-REFERENCE TO RELATED APPLICATIONS

This application is a national stage application of International Patent Application PCT/EP2020/071267, filed on Jul. 28, 2020 and titled "Detachable Motorized Device For Closing A Space, In Particular Inside An Airplane," which is related to and claims priority to France Patent Application No. 1908963, filed on Aug. 5, 2019, both of which are hereby incorporated by reference in their entireties.

The present invention relates to a detachable motorized device for closing a space, in particular inside an airplane.

The objective of the invention is also to provide an arrangement of seats which ensures both the comfort and the safety of the passengers, while protecting their privacy. The invention thus finds a particularly advantageous application with airplane seats.

The airplane seats of the 'Business Class' type offer passengers different comfort positions, from a 'seating' position to a 'lying' position, in which the seat defines a substantially horizontal lying surface for the passenger to be able to lie down.

Intermediate comfort positions are also available, such as the 'relaxing' position in which the backrest is strongly inclined. Generally, these intermediate positions are obtained by inclining the backrest which pivots about a horizontal axis. The passenger can then remain in the seat during transitions among the different positions.

The objective of the invention is to improve the privacy of a passenger insofar s/he can isolate her/himself from her/his immediate neighbor or a central aisle of the airplane.

To this end, the invention relates to a detachable device for closing a space inside an airplane, comprising:
- a frame comprising at least one upright, said frame comprising at least one fixing interface to a structural element,
- a curtain assembly comprising a flexible curtain,
- a roller around which the flexible curtain can be wound, and
- at least one guiding device comprising an electric motor actuator, said guiding device being able to provide a translational guidance for the flexible curtain relative to the upright, such that the flexible curtain can be moved in a direction of movement parallel to a longitudinal direction of the upright between a stored position, in which the flexible curtain is mostly wound around the roller, and an extended position in which the flexible curtain is mostly unwound from the roller.

Thanks to the integration of the detachable closing device, the invention thus makes it possible to easily isolate oneself from a neighboring passenger and/or people moving in an aisle. The invention also has the advantage of being easily integrable in the airplane cabin and of being easily released from the access passage to the aisle in the event of an accident because the curtain is flexible.

According to one embodiment, the guiding device comprises an endless screw capable of being driven by the electric motor actuator.

According to one embodiment, the endless screw cooperates via a helical connection with a connection device integral with the curtain assembly, so that a rotation of the endless screw causes a translational movement of the flexible curtain in the direction of movement.

According to one embodiment, the electric motor actuator comprises at least one shaft output mechanically connected to an angle transmission device connected to the endless screw.

According to one embodiment, the electric motor actuator comprises two shaft outputs, each shaft output being mechanically connected to an angle transmission device connected to a endless screw.

According to one embodiment, a shaft output of the electric motor actuator is mechanically connected to the angle transmission device by means of a connection having at least one degree of freedom in rotation, such that a ball joint or a universal joint type connection.

According to one embodiment, the upright defines a housing in which the endless screw is arranged at least in part, preferably completely.

According to one embodiment, the frame is provided with a first upright and a second upright interconnected by a box.

According to one embodiment, the roller is arranged at least in part inside the box.

According to one embodiment, the electric motor actuator is arranged inside the box.

According to one embodiment, the curtain assembly comprises a rigid cross bar fixed to one end of the flexible curtain.

According to one embodiment, one end of the cross bar is able to slide inside a groove in the upright.

The invention also relates to an arrangement of airplane seats comprising:
- a front seat associated with a front shell and a rear seat associated with a rear shell, and
- a detachable closing device as defined above, arranged between the front seat and the rear seat.

According to one embodiment, the detachable closing device comprises a frame having a first upright provided with a fixing interface for ensuring a fixation between the first upright and the front shell of the front seat and a second upright provided with a fixing interface for ensuring a fixation between the second upright and the rear shell of the rear seat.

The invention further relates to an airplane comprising an arrangement of seats as defined above.

Of course the different characteristics, variants and/or embodiments of the present invention can be associated with each other in various combinations as long as they are not mutually incompatible or exclusive.

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein:

FIG. 5 is a perspective view of the upper part of the detachable closing device according to the invention showing the curtain connecting device cooperating with an endless screw;

FIGS. 6a and 6b are respectively perspective and top views illustrating the integration of a detachable closing device according to the invention in an arrangement of airplane seats.

It should be noted that, in the figures, the structural and/or functional elements common to the different embodiments may have the same references. Thus, unless otherwise stated, such elements have identical structural, dimensional and material properties.

The relative terms such as 'horizontal' or 'vertical' are understood by reference to a detachable closing device according to the invention in the position of use, which corresponds to the orientations of FIGS. 1, 2, 6a and 6b in particular.

Figure 1:
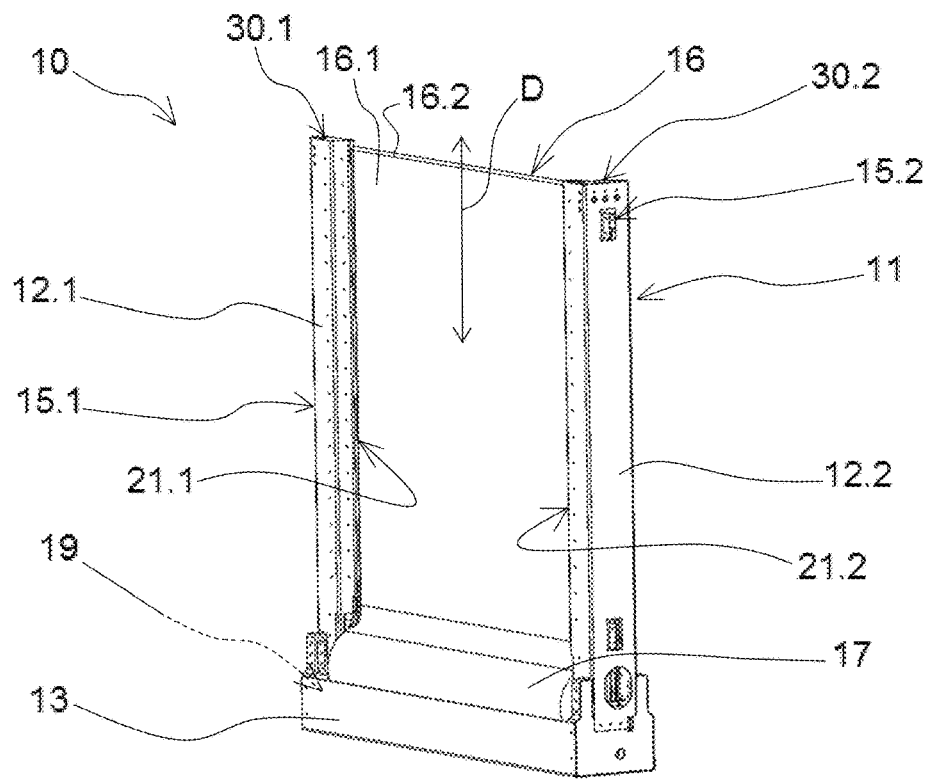
FIG. 1 is a perspective view of a detachable device for closing a space according to the present invention.
Figure 2:
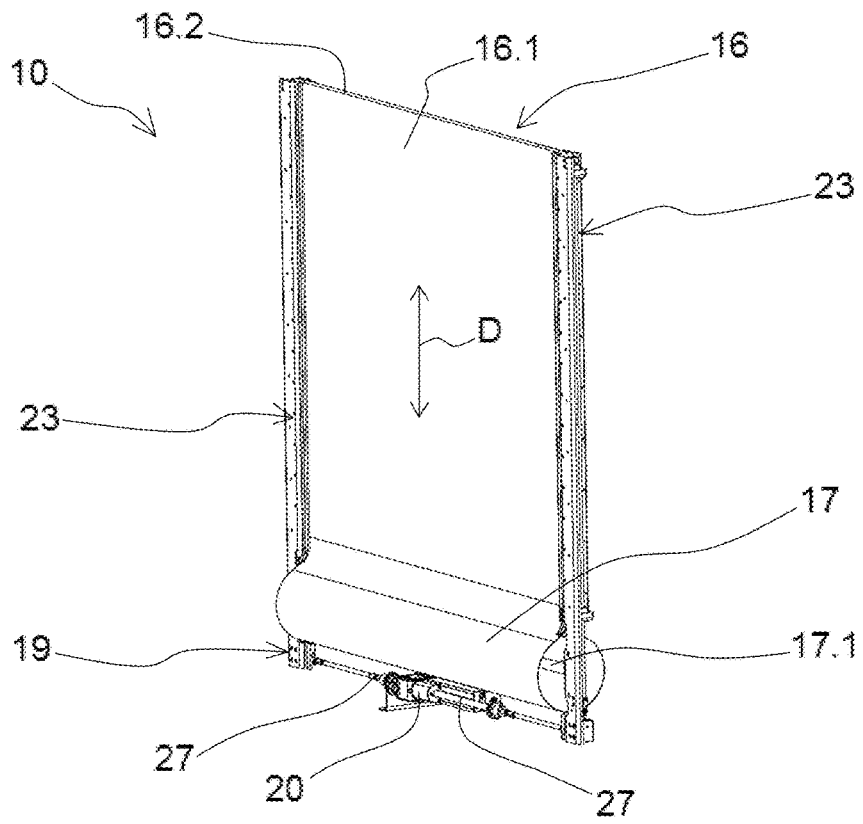
FIG. 2 is a perspective view of the closing device in FIG. 1 without the uprights or the box so as to show the device for guiding the curtain in translation.

FIGS. 1 and 2 show a detachable device 10 for closing a space inside an airplane. The space to be closed may be a space separating two adjacent seats or a space separating a seat from an aisle.

The device 10 comprises a frame 11 comprising a first upright 12.1 and a second upright 12.2 interconnected by a hollow box 13. The uprights 12.1, 12.2 are oriented vertically, while the box 13 is arranged horizontally, so that the frame 11 has an overall U-shape.

The frame 11 comprises at least one fixing interface 15.1, 15.2 to a structural element, such as a seat shell or any other structural element inside an airplane cabin. In this case, the first upright 12.1 comprises a fixing interface 15.1 to a shell of a first seat and the second upright 12.2 comprises a fixing interface 15.2 to a shell of a second seat.

A curtain assembly 16 comprises a flexible curtain 16.1 capable of being wound around a roller 17. To this end, the roller 17 comprises an axis 17.1 mounted so as to rotate relative to the frame 11. In addition, a rigid cross bar 16.2 is fixed to one end of the flexible curtain 16.1. Thus the curtain assembly 16 is formed by the curtain 16.1 as well as the cross bar 16.2.

The flexible curtain 16.1 is preferably made of fabric. The curtain 16.1 could also be made at least partly of alcantara or leather so as to increase the perceived quality of the whole. The curtain 16.1 may be made at least partly of an acoustic absorption material.

The cross bar 16.2 is preferably made of a metallic material, in particular aluminum. As a variant, the cross bar 16.2 may be made of plastic or a composite material or any possible other rigid material.

The roller 17 is arranged at least partly inside the box 13. A cover (not shown) can be fixed to the box 13 so as to hide a part of the roller 17 protruding from the box 13.

Figure 3A:
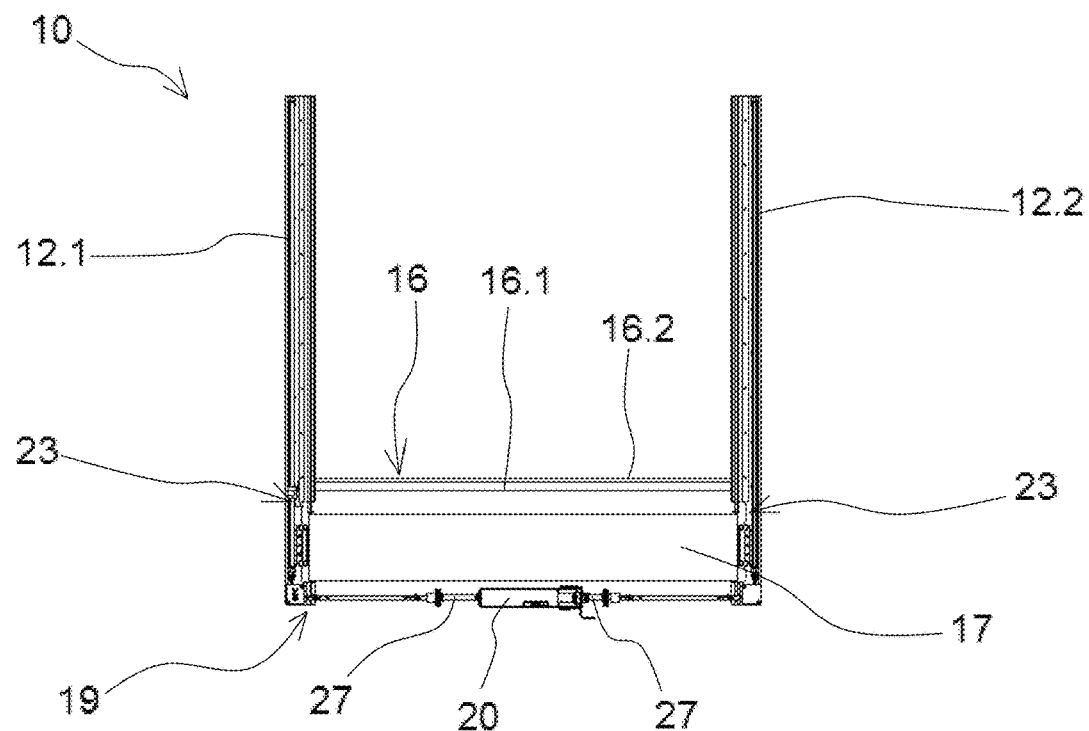
FIGS. 3a, 3b, 3c are front views of a detachable closing device according to the invention respectively in a stored position, an intermediate position, and an extended position.
Figure 3B:
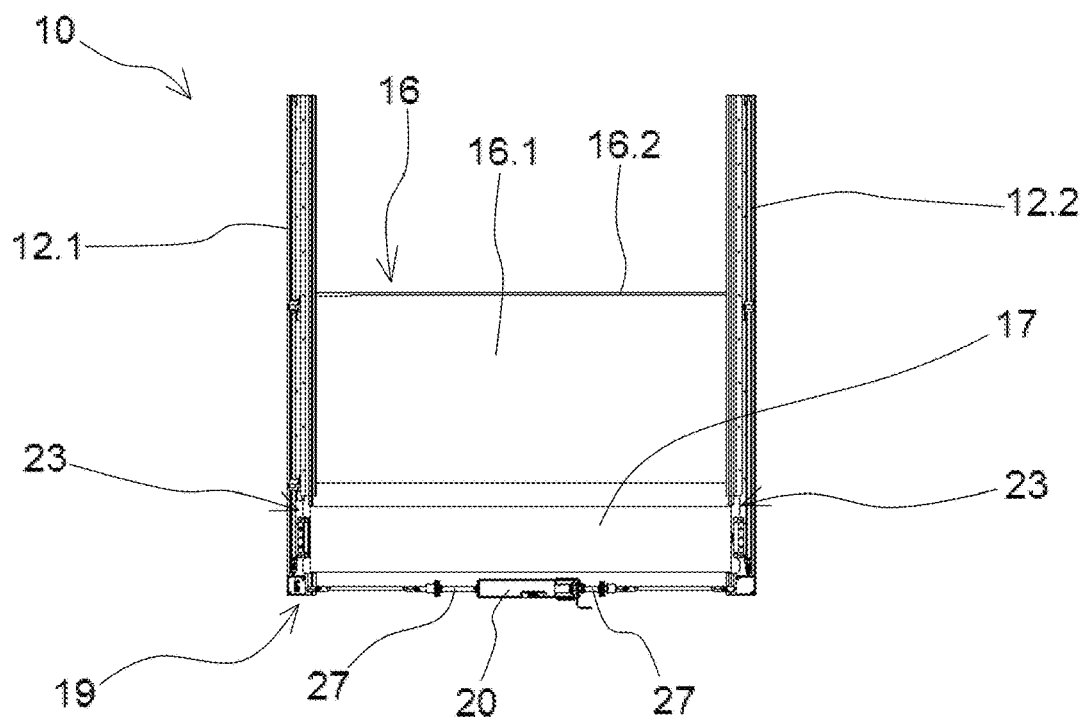
Figure 3C:
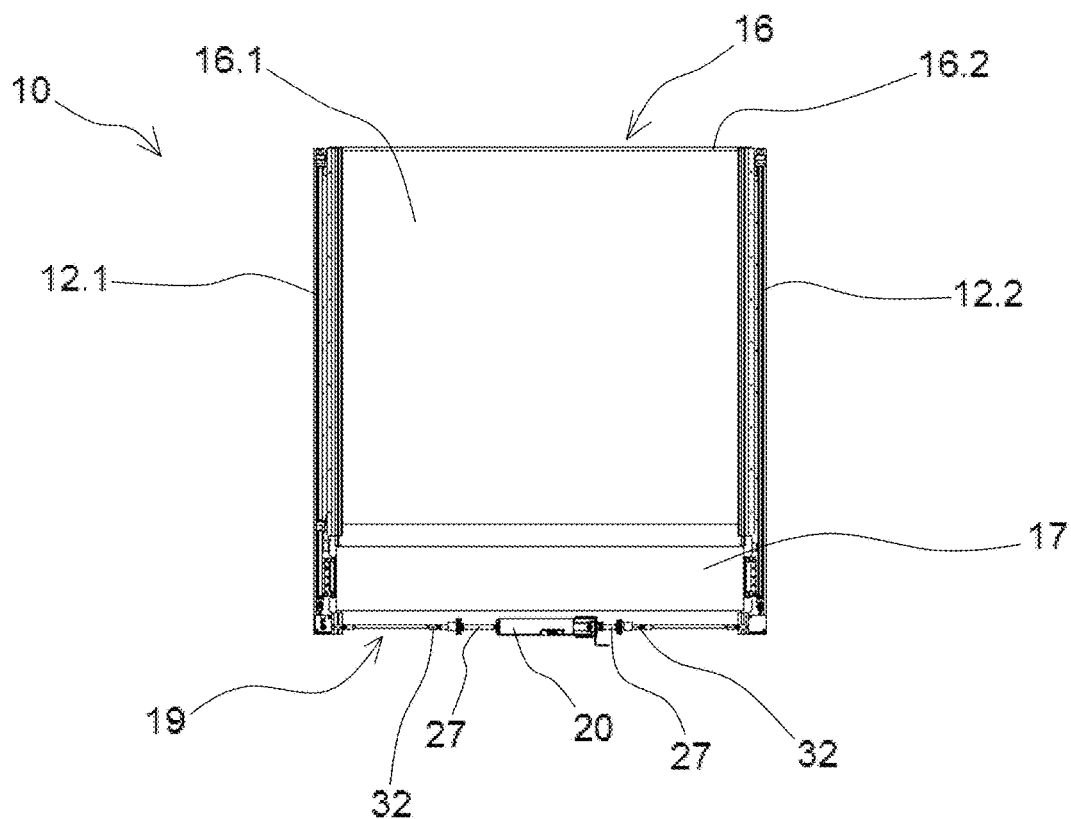

As can be seen in FIG. 2, a guiding device 19 provided with an electric motor actuator 20 ensures a translational guidance of the curtain 16.1 in a direction of movement D parallel to a longitudinal direction of an upright 12.1, 12.2 between a stored position, in which the flexible curtain 16.1 is mainly wound around the roller 17 so as to clear the space, as shown in FIG. 3a, and an extended position in which the flexible curtain 16.1 is mainly unwound from the roller 17 so as to close the space, as shown in FIG. 3c. The curtain 16.1 can also take intermediate positions, as shown in FIG. 3b.

One end of the cross bar 16.2 is able to slide inside a groove 21.1, 21.2 in a corresponding upright 12.1, 12.2 during the movement of the curtain 16.1 from one position to another, as shown in FIG. 1. The edges of the curtain 16.1 also slide inside the grooves 21.1, 21.2 in the uprights 12.1, 12.2. To this end, the edges of the curtain 16.1 pass through the grooves 21.1, 21.2 so as to provide a vertical guidance of the curtain 16.1.

Figure 4:
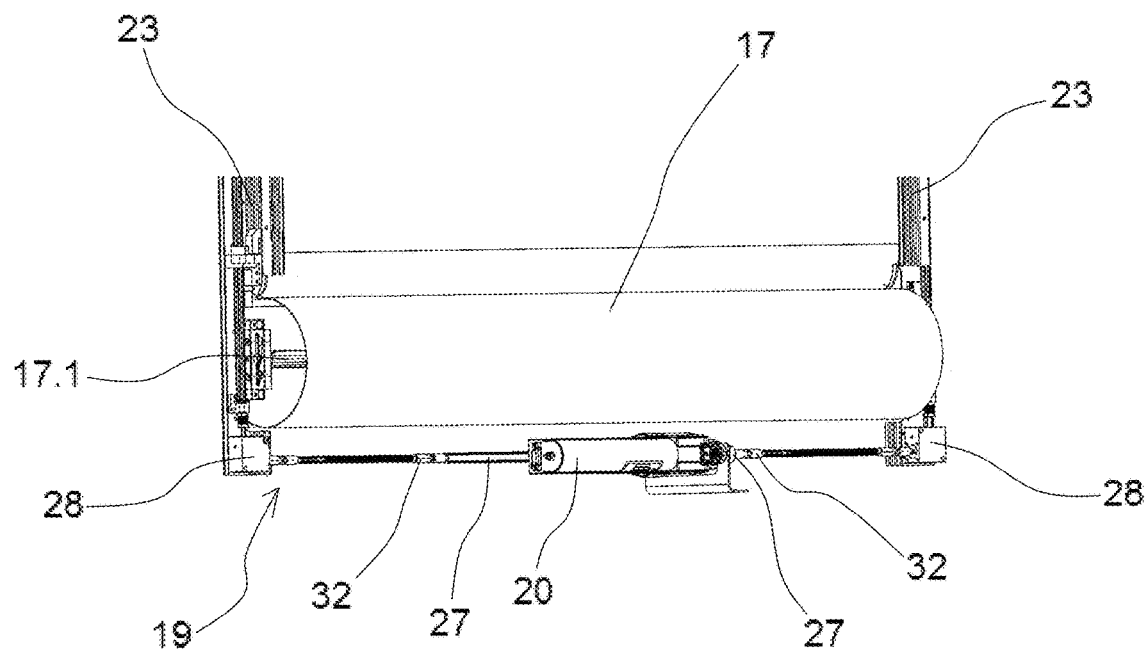
FIG. 4 is a perspective view of the lower part of the detachable closing device according to the invention showing the electric motor actuator.

As can be seen in FIGS. 4 and 5, the guiding device 19 comprises an endless screw 23 capable of being rotated relative to the frame 11 by the actuator 20.

The endless screw 23 is arranged at least partly, preferably completely, inside a housing 30.1, 30.2 delimited by a corresponding upright 12.1, 12.2, as shown in FIG. 1. For this purpose, an upright 12.1, 12.2 may be formed by a folded sheet metal so as to form a corresponding housing 30.1, 30.2. As a variant, an upright 12.1, 12.2 may be formed of several independent walls assembled together by a screwing or mechanical welding process.

The endless screw 23 cooperates via a helical connection 24 with a connecting device 25 integral with the curtain assembly 16.1, as shown in FIG. 5. The connecting device 25 can be fixed to the curtain 16.1 or the cross bar 16.2. The connecting device 25 is arranged inside an housing in a corresponding upright 12.1, 12.2. The connecting device 25 has a non-circular section having a shape complementary to that of the upright 12.1, 12.2 in order to prevent the connecting device 25 from rotating relative to the upright 12.1, 12.2.

Thus, a rotation of the endless screw 23 only causes a translational movement of the connecting device 25 along the endless screw 23. The upright 12.1, 12.2 ensures, via its internal walls, the guidance of the connecting device 25. Depending on the direction of rotation of the endless screw 23, the curtain 16.1 can thus be moved up or down depending on the direction of movement D.

Advantageously, as can be seen in FIG. 4, the actuator 20 has two shaft outputs 27. The shaft outputs 27 are coaxial and arranged at each end of the actuator 20. Each shaft output 27 is mechanically connected to an angle transmission device 28 connected to an endless screw 23. The angle transmission device 28 is a standard gear device. Thus, the actuator 20 and its shaft outputs 27 can have a horizontal orientation, while the endless screw 23 has a vertical orientation. The electric motor actuator 20 is preferably placed inside the box 13.

As a variant, the actuator 20 comprises a single shaft output 27 connected to an angle transmission device 28. As a variant, an electric actuator 20 is coupled to a lower or upper end of each endless screw 23, with a shaft outlet 27 coaxial to the endless screw 23.

Advantageously, a shaft output 27 of the actuator 20 is mechanically connected to the angle transmission device 28 by means of a connection 32 having at least one degree of freedom in rotation, such as a ball joint or a universal joint connection. This makes it possible to compensate for misalignments between the output of the actuator 20 and the angle transmission device 28.

Figure 6B:
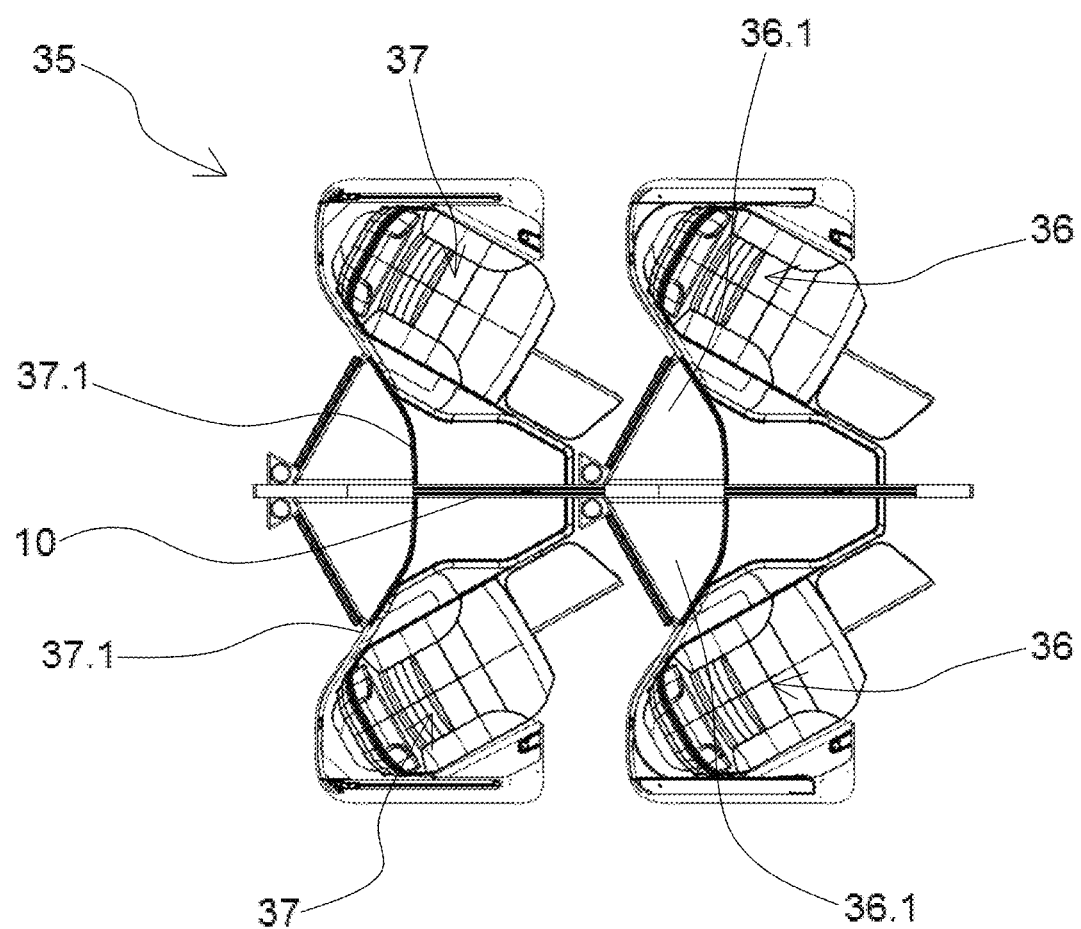

FIGS. 6a and 6b show a detachable closing device 10 integrated into an arrangement of airplane seats 35 comprising two front seats 36, each associated with a front shell 36.1 and two rear seats 37, each associated with a rear shell 37.1.

A detachable closing device 10 is arranged between a front seat 36 and a rear seat 37. For this purpose, the first upright 12.1 is fixed to the front shell 36.1 of a front seat 36 via its fixing interface 15.1, while the second upright 12.2 is fixed to the rear shell 37.1 of a rear seat 37 via its fixing interface 15.2. For this purpose, a fixing interface 15.1, 15.2 to an upright 12.1, 12.2 comprises holes for fixing members, such as screws, rivets, or studs, or other members adapted to the application, also passing through holes in the corresponding shell 36.1, 37.1.

During an mounting phase, we begin by fixing an upright 12.1, 12.2 of the closing device 10 to one of the shells, for example the rear shell 37.1, then the other shell, for example the front shell 36.1, is fixed to the other upright 12.1,12.2 of the closing device 10.

Thanks to the integration of the closing device 10, the invention thus makes it possible to easily isolate the two rear seats 37 placed side by side, or on the contrary to allow communication between the two rear seats 37 when the curtain 16.1 is in the stored position.

The invention also has the advantage of being easily integrable into the airplane cabin and of being easily removable from the passage in the event of an accident because the curtain 16.1 is flexible.

Obviously, the invention is not limited to the embodiments described above and provided solely by way of example. It encompasses various modifications, alternative forms and other variants which a person skilled in the art may envisage in the context of the present invention and in particular any combination of the various operating modes described above may be taken separately or in combination.

The invention claimed is:

1. A detachable closing device for closing a space inside an airplane, comprising:
    a frame comprising a first upright comprising a first fixing interface configured to attach the detachable closing device to a first structural element of a first seat and a second upright comprising a second fixing interface configured to attach the detachable closing device to a second structural element of a second seat, said first fixing interface and second fixing interface comprising holes for fixing members passing through holes in the corresponding structural element for providing removability of the detachable closing device as a whole from the first and second structural elements;
    a curtain assembly comprising a flexible curtain;
    a roller, wherein the flexible curtain is windable on the roller;
    a guiding device comprising an electric motor actuator and a first endless screw capable of being rotated relative to the frame by the actuator, said first endless screw extending vertically along the first upright, said guiding device configured to provide a translational guidance of the flexible curtain relative to the first upright, such that the flexible curtain is movable in a direction of movement parallel to a longitudinal direction of the first upright between a stored position, in which the flexible curtain is mostly wound around the roller, and an extended position in which the flexible curtain is mostly unwound from the roller, wherein the first endless screw cooperates via a helical connection with a connecting device that is integral with the curtain assembly, the connecting device having a non-circular section having a shape complementary to that of the first upright in order to prevent the connecting device from rotating relative to the first upright, so that a rotation of the first endless screw causes a translational movement of the flexible curtain in the direction of movement.

2. The closing device according to claim 1, wherein the guiding device comprises a second endless screw; and the electric motor actuator comprises a first shaft output mechanically connected to a first angle transmission device which is connected to the first endless screw and a second shaft output mechanically connected to a second angle transmission device which is connected to the second endless screw, each of the first angle transmission device and the second angle transmission device being a right-angle transmission.

3. The closing device according to claim 2, wherein the first shaft output is coupled by means of a first connection to the first angle transmission device which connects to the first endless screw and the second shaft output is coupled by means of a second connection to the second angle transmission device which connects to the second endless screw.

4. The closing device according to claim 3, wherein each of the first connection and the second connection has at least one degree of freedom in rotation.

5. The closing device according to claim 1, wherein each of the first and second upright defines a housing, and wherein the corresponding endless screw is at least partly arranged in the housing.

6. The closing device according to claim 1, wherein the first upright and the second upright are interconnected by a box.

7. The closing device according to claim 6, wherein the roller is arranged at least partly inside the box.

8. The closing device according to claim 6, wherein the electric motor actuator is arranged inside the box.

9. The closing device according to claim 1, wherein the flexible curtain comprises an end, and wherein the curtain assembly comprises a rigid cross bar fixed to the end of the flexible curtain.

10. The closing device according to claim 9, wherein an end of the cross bar is slidable inside a groove made in at least one of the first and second uprights.

11. An arrangement of airplane seats, comprising:
    a front seat with a front shell and a rear seat with a rear shell, and
    a detachable closing device as defined in claim 1, arranged between the front seat and the rear seat.

12. An airplane comprising an arrangement of airplane seats as defined in claim 11.

* * * * *